(12) United States Patent
Fukuda

(10) Patent No.: US 7,213,156 B2
(45) Date of Patent: May 1, 2007

(54) CONTENTS DATA TRANSMISSION/RECEPTION SYSTEM, CONTENTS DATA TRANSMITTER, CONTENTS DATA RECEIVER AND CONTENTS DATA TRANSMISSION/RECEPTION METHOD

(75) Inventor: Keiichi Fukuda, Fukushima (JP)

(73) Assignee: D&M Holdings Inc., Kanagawa (JP)

( * ) Notice: Subject to any disclaimer, the term of this patent is extended or adjusted under 35 U.S.C. 154(b) by 810 days.

(21) Appl. No.: 10/400,491

(22) Filed: Mar. 28, 2003

(65) Prior Publication Data

US 2004/0057582 A1 Mar. 25, 2004

(30) Foreign Application Priority Data

Sep. 25, 2002 (JP) .............................. 2002-279072

(51) Int. Cl.
*H04L 9/32* (2006.01)
(52) U.S. Cl. ...................................... 713/189; 713/193
(58) Field of Classification Search ............ 726/25–33; 380/201–202, 281, 284; 713/189, 193; 705/57–59
See application file for complete search history.

(56) References Cited

U.S. PATENT DOCUMENTS 5,339,315 A * 8/1994 Maeda et al. ................ 725/103

FOREIGN PATENT DOCUMENTS

| EP | 0 682 425 A2 | 11/1995 |
|---|---|---|
| EP | 0 874 300 A2 | 10/1998 |
| EP | 0 977 107 A2 | 2/2000 |
| EP | 1 89 488 A1 | 4/2001 |
| EP | 1 161 040 A2 | 12/2001 |
| JP | 11-289323 | 10/1999 |
| JP | 2000-242604 | 9/2000 |

OTHER PUBLICATIONS

Hitachi, Ltd. Et al., "5C Digital Transmission Content Protection White Paper—Revision 1.0", DTCP Group, Jul. 14, 1998, XP002134182.

* cited by examiner

*Primary Examiner*—Hosuk Song
(74) *Attorney, Agent, or Firm*—Dickstein Shapiro LLP

(57) ABSTRACT

An object of the invention is to prevent original high quality contents data from being illegally obtained by extracting encryption breaking information from data transmitted through a single signal line for connecting two apparatuses and by using the encryption breaking information to decrypt encrypted contents data. In a contents data transmission/reception system, a contents data transmitter encrypts contents data by using key information, transmits the key information through plural signal lines to a contents data receiver, and then, transmits the encrypted contents data through the plural signal lines to the contents data receiver. The contents data receiver acquires the key information from data transmitted from the contents data transmitter through the plural signal lines, receives the encrypted contents data transmitted from the contents data transmitter through the plural signal lines, and decrypts the encrypted contents data by using the key information.

20 Claims, 9 Drawing Sheets

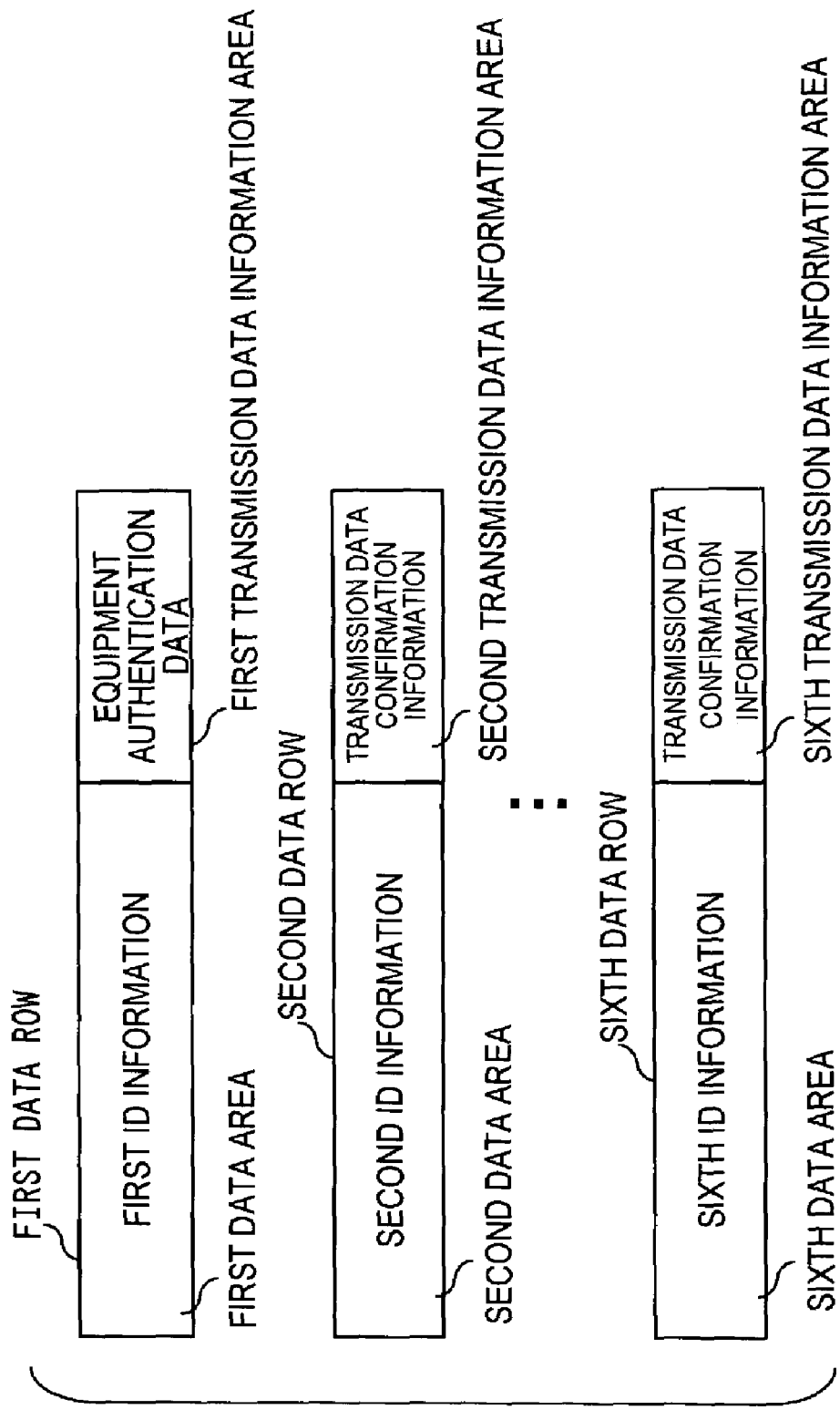

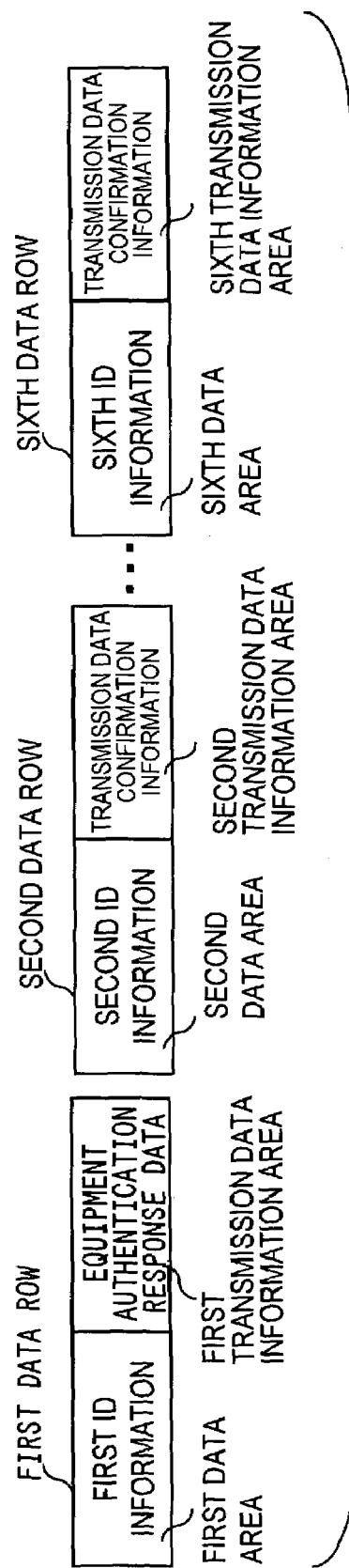

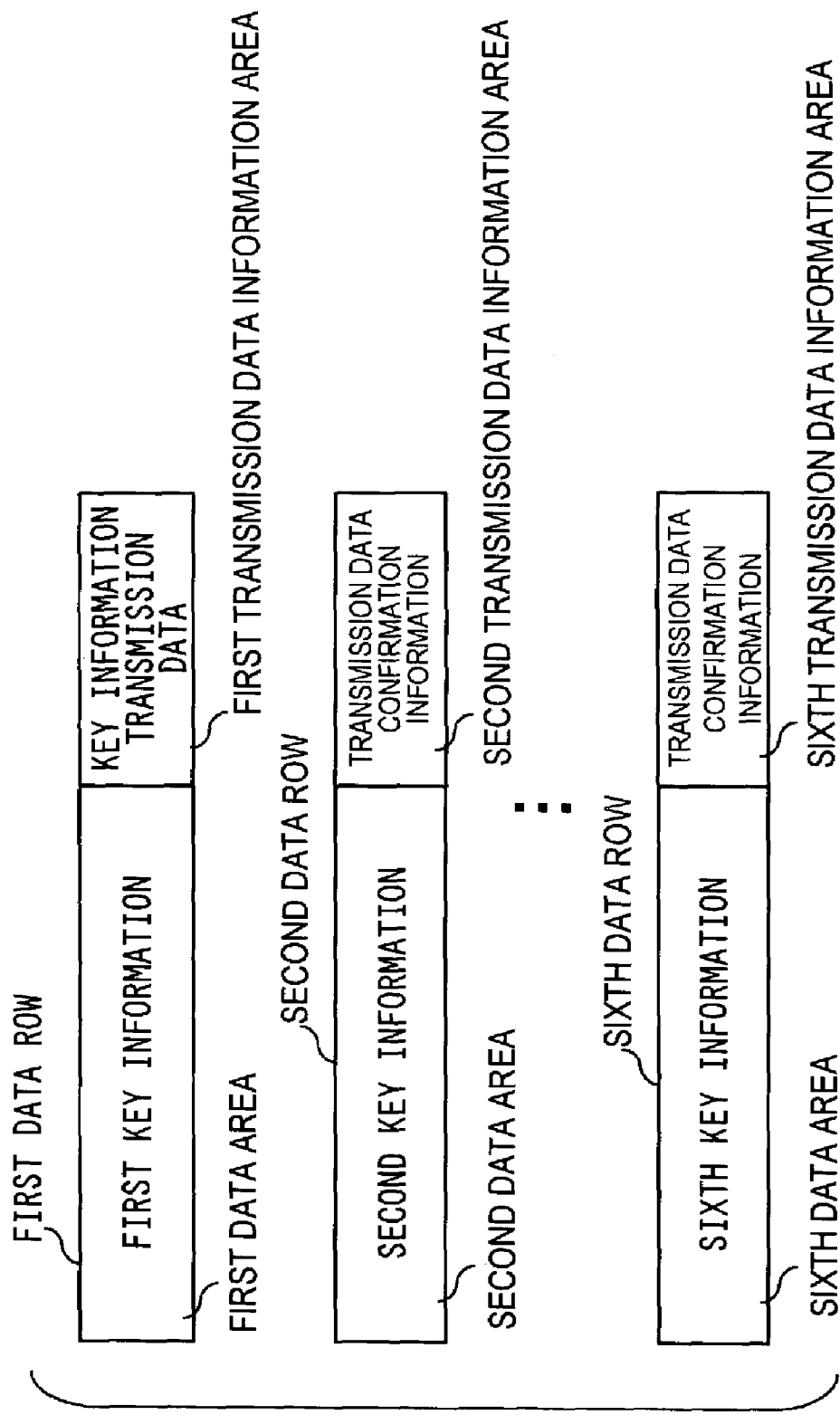

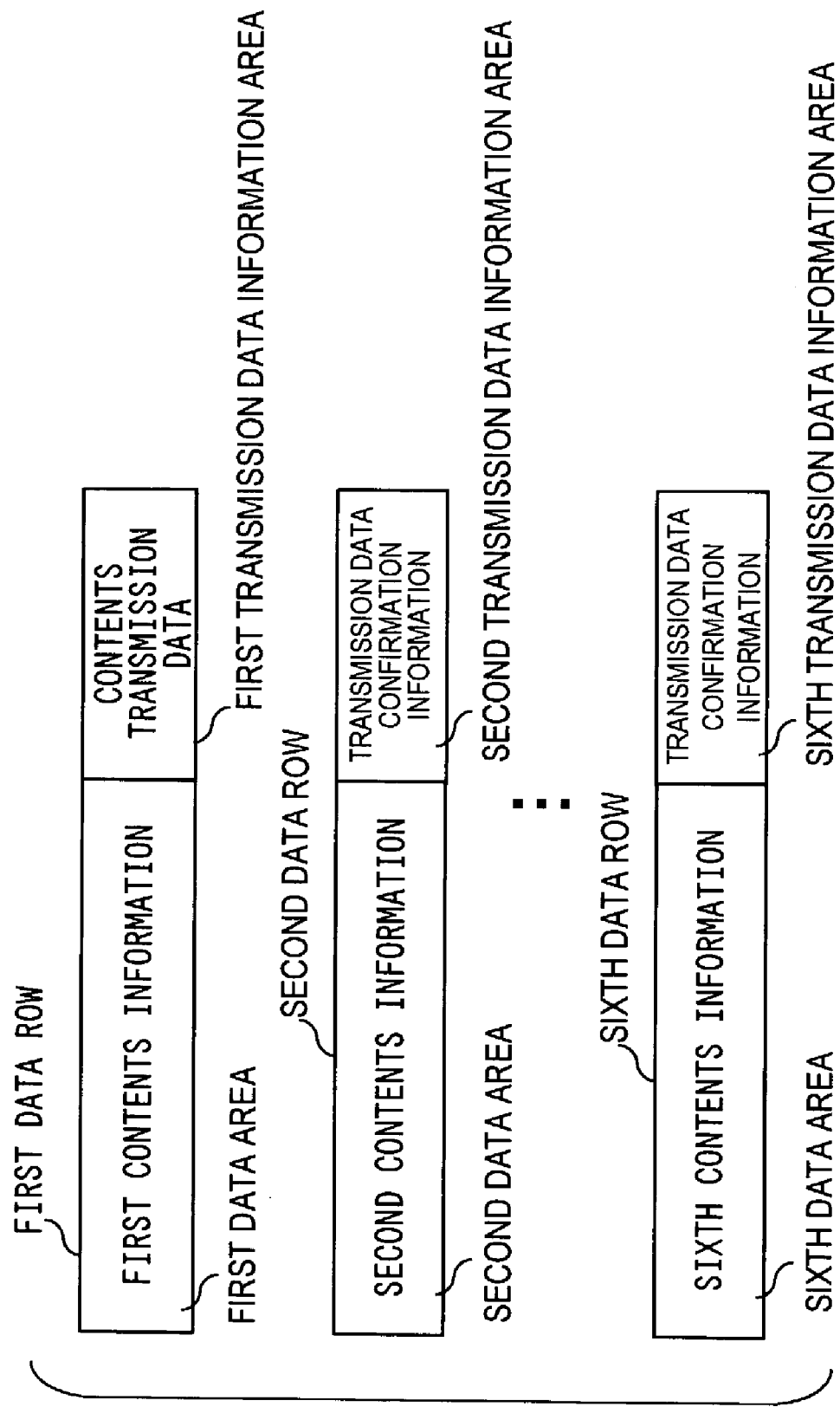

CONTENTS DATA TRANSMISSION/RECEPTION SYSTEM, CONTENTS DATA TRANSMITTER, CONTENTS DATA RECEIVER AND CONTENTS DATA TRANSMISSION/RECEPTION METHOD

BACKGROUND OF THE INVENTION

1. Field of the Invention

The present invention relates to a contents data transmission/reception system in which contents data, such as audio data and video data, is transmitted and received between plural apparatuses, a contents data transmitter, a contents data receiver, and a contents data transmission/reception method.

2. Description of the Related Art

There is a digital versatile disc (DVD) as a recording medium which can record massive data. The DVD includes a DVD-VIDEO in which video data and audio data are recorded, and a DVD-AUDIO in which high quality audio data is recorded. An optical disc reproducing apparatus for reproducing these DVDs reproduces digital data recorded in the DVD, and can analog-output audio data as an analog signal or digital-output it as two-channel digital data.

There is a case where audio data of plural channels (multi-channel) such as an L-channel, an R-channel, a surround L-channel, a surround R-channel, and a center channel are recorded in the DVD. In the case where the multi-channel audio data recorded in the DVD is digital-outputted, the optical disc reproducing apparatus down-mixes the multi-channel audio data into 2-ch digital data, and outputs the down-mixed data as digital data in compliance with a data format of IEC60958.

There is a case where the sound quality of the audio data analog-outputted from the optical disc reproducing apparatus is degraded since noise is superposed during signal transmission. As compared with analog output audio data, the sound quality of the audio data digital-outputted from the optical disc reproducing apparatus is not degraded by the superposition of noise during signal transmission.

When the audio data is digital-outputted, the optical disc reproduction apparatus converts the multi-channel audio data recorded in the DVD into the 2-channel audio data and outputs it. An amplifier (for example, AV (Audio Visual) amplifier) for amplifying the audio data outputted from the optical disc reproducing apparatus and outputting it to a speaker or the like receives the 2-channel audio data digital-outputted from the optical disc reproducing apparatus, converts it into multi-channel audio data and outputs it.

In the amplifier, the processing of converting the input 2-channel audio data into the multi-channel audio data is performed by conversion means mounted in the amplifier. In this arithmetic processing, since parameters used for its processing method and calculation vary according to respective manufacturers of the conversion means (for example, DSP (Digital Signal Processor)), the inputted 2-channel audio data can not be faithfully converted into the audio data of the original multi-channel recorded in the DVD. In other words, the 2-channel audio data is converted into multi-channel audio data, so that the audio data the sound quality of which is more degraded than the multi-channel audio data recorded in the optical disc is outputted from the amplifier.

Thus, there has been raised a demand for faithfully reproducing high sound quality audio data recorded in an optical disc in such a manner that the foregoing conversion processing is not performed to the multi-channel digital data, the audio data reproduced by the optical disc reproducing apparatus is digital-outputted as the multi-channel audio data, and the amplifier as the receiving side of the digital data converts the multi-channel digital audio data into an analog audio signal and outputs it.

However, in the case where the multi-channel digital audio data is outputted from the optical disc reproducing apparatus, it becomes possible to illegally copy the digital audio data on a recording medium. In order to prevent the illegal copy of the digital audio data, it is conceivable to use a technique to transmit and receive encrypted contents data between two apparatuses, like a data transmission system as disclosed in JP-A-11-289323 (patent publication 1) or a contents distribution system as disclosed in JP-A-2000-242604 (patent publication 2).

In the data transmission system disclosed in the patent publication 1, a client computer creates an encryption key and a decryption key, sends the encryption key and an image data transfer request to a server computer, the server computer encrypts the image data by the encryption key, transmits the encrypted image data to the client computer, and the client computer uses the held decryption key to decrypt the encrypted image data.

In the contents distribution system disclosed in the patent publication 2, when a user ID, an authentication ID and a download request for contents data are transmitted from a client to a server, in the case where the user ID and the contents data are registered in a table of the server, and the authentication ID held by the server is identical to the authentication ID transmitted from the client, the server creates a decryption key for decrypting the encrypted contents, and transmits the encrypted contents data and the decryption key to the client. The client uses the decryption key transmitted from the server to decrypt the encrypted contents data, and reproduces the contents data.

In the data transmission system disclosed in the patent publication 1 or the contents distribution system disclosed in the patent publication 2, the encrypted contents data is transmitted by using a single signal line for connecting the apparatuses, and the single signal line for connecting the apparatuses is used to transmit the encryption breaking information for decrypting the encryption of the encrypted contents data.

In the system as described above, since the encryption breaking information is transmitted as one piece of information through the single signal line from the contents data transmitter to the contents data receiver, there is a problem that the original high quality contents data can be obtained by extracting the encryption breaking information from the data transmitted between the two apparatuses and decrypting the encrypted contents data by using the encryption breaking information.

The present invention has an object to provide a contents data transmission/reception system in which it is difficult to extract and decrypt encryption breaking information for decrypting encrypted contents data transmitted and received between plural apparatuses, a contents data transmitter, a contents data receiver, and a contents data transmission/reception method.

SUMMARY OF THE INVENTION

According to a first aspect of the invention, a contents data transmission/reception system comprises a contents data transmitter for transmitting contents data, and a contents data receiver for receiving the contents data, and is characterized in that the contents data transmitter encrypts the contents data by using key information, transmits the key information through plural signal lines to the contents data receiver, and then, transmits the encrypted contents data through the plural signal lines to the contents data receiver, and the contents data receiver acquires the key information from data transmitted from the contents data transmitter through the plural signal lines, receives the encrypted contents data transmitted from the contents data transmitter through the plural signal lines, and decrypts the encrypted contents data by using the key information.

According to a second aspect of the invention, a contents data transmission/reception system comprises a contents data transmitter for transmitting contents data, and a contents data receiver for receiving the contents data, and is characterized in that the contents data transmitter includes a contents reproduction part for reproducing the contents data, a key information creation part for creating key information for encrypting the contents data, a contents encryption part for encrypting the contents data reproduced by the contents data reproduction part by using the key information, a transmitter transmission/reception part for transmitting the key information through plural signal lines to the contents data receiver and transmitting the encrypted contents data through the plural signal lines to the contents data receiver, and a transmitter control part for performing a control to transmit the encrypted contents data through the plural signal lines to the contents data receiver after the key information is transmitted by the transmitter transmission/reception part through the plural signal lines, and the contents data receiver includes a receiver transmission/reception part for receiving the data transmitted through the plural signal lines from the contents data transmitter, key information extraction part for extracting the key information from the data received by the receiver transmission/reception part, a contents decryption part for extracting the encrypted contents data from the data received by the receiver transmission/reception part and decrypting the encrypted contents data by using the key information extracted by the key information extraction part, an output part for outputting the contents data decrypted by the contents decryption part, and a receiver control part for performing a control to extract the key information from the data received by the receiver transmission/reception part and to decrypt the encrypted contents data received by the receiver transmission/reception part.

According to a third aspect of the invention, the contents data transmission/reception system of the second aspect is characterized in that the contents data transmitter includes a transmitter ID authentication part which includes a transmission ID storage part for storing plural pieces of receiver ID information allocated to respective contents data receivers, and selects one piece of receiver ID information of the plural pieces of receiver ID information and confirms that information indicating coincidence of the receiver ID information is transmitted from the contents data receiver, the transmitter control part performs a control to transmit the receiver ID information selected by the transmitter ID authentication part by the transmitter transmission/reception part through the plural signal lines to the contents data receiver and performs a control, when the information indicating the coincidence of the receiver ID information is received from the contents data receiver, to transmit the key information and the encrypted contents data by the transmitter transmission/reception part through the plural signal lines to the contents data receiver, the contents data receiver includes a receiver ID authentication part which includes a reception ID storage part for storing the receiver ID information allocated to the contents data receiver and checks the receiver ID information transmitted from the contents data transmitter against the receiver ID information stored in the reception ID storage part, and the receiver control part performs a control, in a case where the receiver ID information transmitted from the contents data transmitter is coincident with the receiver ID information stored in the reception ID storage part, to transmit the information indicating the coincidence of the receiver ID information to the contents data transmitter through a single signal line by the receiver transmission/reception part.

According to a fourth aspect of the invention, a contents data transmitter for transmitting contents data to a contents data receiver is characterized by including a contents reproduction part for reproducing the contents data, a key information creation part for creating key information for encrypting the contents data, a contents encryption part for encrypting the contents data reproduced by the contents data reproduction part by using the key information created by the key information creation part, a transmitter transmission/reception part for transmitting the key information and the encrypted contents data through plural signal lines to the contents data receiver, and a transmitter control part for performing a control to transmit the encrypted contents data by the transmitter transmission/reception part through the plural signal lines to the contents data receiver after the key information is transmitted by the transmitter transmission/reception part through the plural signal lines to the contents data receiver.

According to a fifth aspect of the invention, the contents data transmitter of the fourth aspect is characterized in that the contents data transmitter includes a transmitter ID authentication part which includes a transmission ID storage part for storing plural pieces of receiver ID information allocated to respective contents data receivers, and selects any one piece of receiver ID information of the plural pieces of receiver ID information and confirms that information indicating coincidence of the receiver ID information is transmitted from the contents data receiver, and the transmitter control part performs a control to transmit the receiver ID information by the transmitter transmission/reception part through the plural signal lines to the contents data receiver and performs a control, after the information indicating the coincidence of the receiver ID information is received from the contents data receiver, to transmit the key information and the encrypted contents data by the transmitter transmission/reception part through the plural signal lines to the contents data receiver.

According to a sixth aspect of the invention, a contents data receiver for receiving contents data transmitted by a contents data transmitter is characterized by including a receiver transmission/reception part for receiving data transmitted by the contents data transmitter through plural signal lines, a key information extraction part for extracting key information from the data received by the receiver transmission/reception part, a contents decryption part for extracting the encrypted contents data from the data received by the receiver transmission/reception part and decrypting the encrypted contents data by using the key information extracted by the key information extraction part, an output part for outputting the contents data decrypted by the contents decryption part, and a receiver control part for performing a control to extract the key information from the data transmitted by the contents data transmitter through the plural signal lines and to decrypt the encrypted contents data transmitted by the contents data transmitter through the plural signal lines by using the key information.

According to a seventh aspect of the invention, the contents data receiver of the sixth aspect is characterized in that the contents data receiver includes a receiver ID authentication part which includes a reception ID storage part for storing receiver ID information allocated to the contents data receiver, and checks receiver ID information transmitted by the contents data transmitter against the receiver ID information stored in the reception ID storage part, and the receiver control part performs a control, when the receiver ID information transmitted by the contents data transmitter through the plural signal lines is coincident with the receiver ID information stored in the reception ID storage part, to transmit information indicating coincidence of the receiver ID information to the contents data transmitter through a single signal line by the receiver transmission/reception part.

According to an eighth aspect of the invention, a contents data transmission/reception method for transmitting and receiving contents data between a contents data transmitter and a contents data receiver comprises a first step of transmitting receiver ID information allocated to each contents data receiver from the contents data transmitter though plural signal lines to the contents data receiver, a second step of checking the receiver ID information transmitted from the contents data transmitter through the plural signal lines against receiver ID information included in the contents data receiver and transmitting, in a case where these pieces of receiver ID information are coincident with each other, information indicating coincidence of the receiver ID information from the contents data receiver through a single signal line to the contents data transmitter, a third step of, in a case where the information indicating the coincidence of the receiver ID information is received from the contents data receiver, transmitting key information encrypting the contents data from the contents data transmitter through the plural signal lines to the contents data receiver, a fourth step of, when the key information is extracted from data transmitted from the contents data transmitter, transmitting information indicating reception of the key information from the contents data receiver through the single signal line to the contents data transmitter, and a fifth step of, when the information indicating the reception of the key information is received from the contents data receiver, transmitting encrypted contents data from the contents data transmitter through the plural signal lines to the contents data receiver.

BRIEF DESCRIPTION OF THE DRAWINGS

FIGS. 3A and 3B are views showing formats of equipment authentication data and equipment authentication response data in the contents data transmission/reception system of the embodiment;

FIGS. 4A and 4B are views showing formats of key information transmission data and key information reception data in the contents data transmission/reception system of the embodiment;

FIGS. 5A and 5B are views showing formats of contents transmission data and contents reception data in the contents data transmission/reception system of the embodiment.

DESCRIPTION OF PREFERRED EMBODIMENTS

Figure 1:
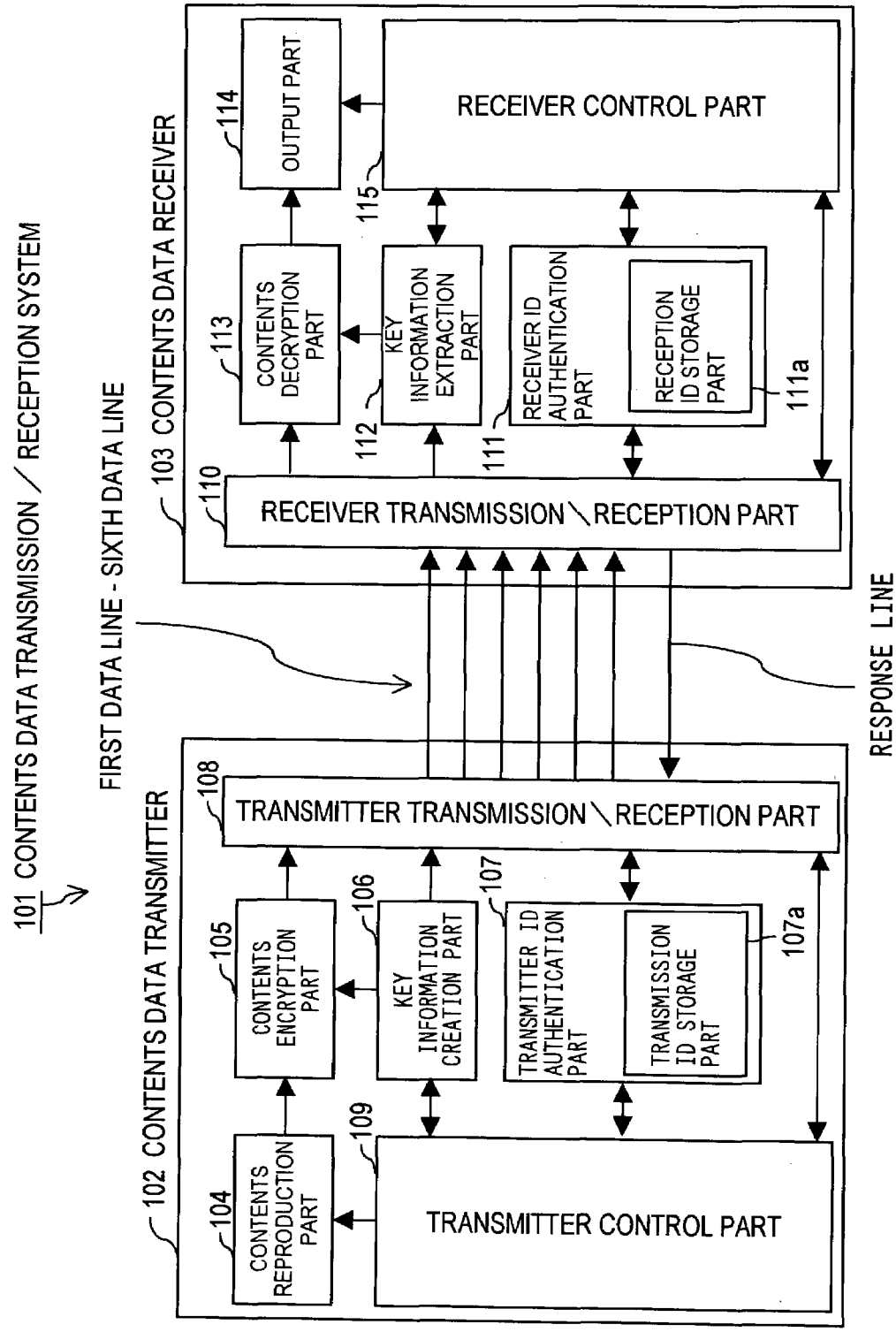
FIG. 1 is a schematic structural view showing an embodiment of a contents data transmission/reception system of the invention.

FIG. 1 is a schematic structural view showing an embodiment of a contents data transmission/reception system of the invention.

In FIG. 1, a contents data transmission/reception system 101 includes a contents data transmitter 102 and a contents data receiver 103. The contents data transmission/reception system 101 is such a system that the contents data transmitter 102 uses key information to encrypt contents data, transmits the key information and the encrypted contents data (encryption contents data) to the contents data receiver 103, the contents data receiver 103 receives the key information and the encrypted contents data transmitted from the contents data transmitter 102, and breaks the encryption of the encrypted contents data by using the key information.

The contents data transmitter 102 is a reproducing apparatus, such as a DVD-Video player, for reproducing and outputting video data and audio data recorded on a recording medium, for example, a digital versatile disc (DVD). In this embodiment, although the description will be given on the premise that the contents data transmitter 102 is the reproducing apparatus, it may be an apparatus for receiving contents data transmitted through a network and outputting the received contents data.

The contents data receiver 103 is an amplifier, such as AV (Audio Visual) amplifier, which receives video data and audio data outputted from, for example, the DVD-Video player, converts the video data into an analog video signal to output it to a disply apparatus such as a monitor, and converts the audio data into an analog audio signal to amplify and to output it to a speaker. In this embodiment, although the description will be given on the premise that the contents data receiver 103 is the amplifier, it may be an apparatus which receives the contents data transmitted from the contents data transmitter 102 and edits the contents data to output it.

The contents data transmitter 102 and the contents data receiver 103 are connected through a video data transmission path for transmitting the video data and an audio data transmission path for transmitting the audio data. In this embodiment, only the audio data transmission path will be described.

In this embodiment, it is assumed that the audio transmission path between the contents data transmitter 102 and the contents data receiver 103 includes seven signal lines for the connection. Six signal lines of the seven signal lines are a first data line to a sixth data line for transmitting data (after-mentioned connection confirmation data, equipment authentication data, key information transmission data and contents transmission data) from the contents data transmitter 102 to the contents data receiver 103, and the remaining one signal line of the seven signal lines is a response line for transmitting data (after-mentioned connection confirmation response data, equipment authentication response data, key information reception data and contents reception data) from the contents data receiver 103 to the contents data transmitter 102. The audio data transmission path as stated above can also use a format in compliance with a digital audio interface as data transmitting through plural signal lines.

The contents data transmitter 102 includes a contents reproduction part 104, a contents encryption part 105, a key information creation part 106, a transmitter ID authentication part 107, a transmitter transmission/reception part 108, and a transmitter control part 109.

The contents reproduction part 104 reproduces contents data (audio data) recorded on a recording medium and outputs it to the contents encryption part 105.

The contents encryption part 105 uses key information created by the key information creation part 106 to encrypt the contents data reproduced by the contents reproduction part 104. An encryption method in the contents encryption part 105 is not particularly limited, and any method may be used.

The key information creation part 106 creates the key information for encrypting the contents data, and outputs it to the contents encryption part 105. The key information is information composed of, for example, a data row of plural bits, and a creation method of the key information is not particularly limited and any method may be used.

Besides, in the case where the created key information is transmitted to the contents data receiver 103, the key information creation part 106 encrypts the created key information and outputs it to the transmitter transmission/reception part 108.

The encryption of the key information in the key information creation part 106 is performed by a previously determined method. An after-mentioned key information extraction part 112 of the contents data receiver 103 has a decryption processing function for breaking the encryption of the key information performed by the key information creation part 106. The key information encrypted by the key information creation part 106 can be decrypted by the after-mentioned key information extraction part 112. In this embodiment, although the key information creation part 106 encrypts the key information and transmits it to the contents data receiver 103, the key information may be transmitted to the contents data receiver 103 without being encrypted.

The transmitter ID authentication part 107 includes a transmission ID storage part 107*a* for storing plural pieces of receiver ID information individually allocated to respective contents data receivers. The transmitter ID authentication part 107 selects one of the plural pieces of receiver ID information stored in the transmission ID storage part 107*a* at the time of after-mentioned equipment authentication, encrypts the reception ID information and outputs it to the transmitter transmission/reception part 108.

An encryption method of the receiver ID information in the transmitter ID authentication part 107 is not particularly limited and any method may be used. An after-mentioned receiver ID authentication part 111 of the contents data receiver 103 has an decryption processing function for breaking the encryption of the receiver ID information performed by the transmitter ID authentication part 107. The receiver ID information encrypted by the transmitter ID authentication part 107 can be decrypted by the after-mentioned receiver ID authentication part 111. In this embodiment, although the transmitter ID authentication part 107 encrypts the receiver ID information and transmits it to the contents data receiver 103, the receiver ID information may be transmitted to the contents data receiver 103 without being encrypted.

Besides, the transmitter ID authentication part 107 checks receiver ID information, which is transmitted from the contents data receiver 103 and is received by the transmitter transmission/reception part 108, against the plural pieces of receiver ID information stored in the transmission ID storage part 107*a*, and notifies the transmitter control part 109 of a check result.

The transmitter transmission/reception part 108 performs, by the control of the transmitter control part 109, transmission/reception of data (connection confirmation data and connection confirmation response data) for performing connection confirmation between the contents data transmitter 102 and the contents data receiver 103, transmission/reception of data (equipment authentication data and equipment authentication response data) for performing equipment authentication, transmission/reception of data (key information transmission data and key information reception data) relating to the key information for breaking the encryption of the encrypted contents data, and transmission/reception of data (contents transmission data and contents reception data) relating to transmission/reception of the encrypted contents data.

Although described later, each of the equipment authentication data, the key information transmission data and the contents transmission data is composed of plural data rows. The transmitter transmission/reception part 108 performs, by the control of the transmitter control part 109, a processing to divide each of the encrypted key information outputted from the key information creation part 106, the encrypted receiver ID information outputted from the transmitter ID authentication part 107, and the encrypted contents data outputted from the contents encryption part 105 and to store the divided data respectively into the plural data rows including in the equipment authentication data, the key information transmission data, and the contents transmission data, and transmits the respective data to the contents data receiver 103.

The transmitter control part 109 comprehensively controls the contents data transmitter 102. When an instruction to start reproduction is issued from an operation part (not shown), the transmitter control part 109 performs the control of the reproduction of the contents data recorded on a recording medium in the contents reproduction part 104.

When the connection confirmation and equipment authentication between the contents data transmitter 102 and the contents data receiver 103 is ended, the transmitter control part 109 performs a control to create the key information for encrypting the contents data in the key information creation part 106. Besides, the transmitter control part 109 performs a control to encrypt the created key information.

The transmitter control part 109 performs a control to encrypt the contents data reproduced by the contents reproduction part 104 by using the key information created by the key information creation part 106 in the contents encryption part 105.

The transmitter control part 109 controls transmission/reception of the connection confirmation data and the connection confirmation response data, transmission/reception of the equipment authentication data and the equipment authentication response data, transmission/reception of the key information transmission data and the key information reception data, and transmission/reception of the contents transmission data and the contents reception data in the transmitter transmission/reception part 108.

Before transmitting the encrypted contents data encrypted by the contents encryption part 105 to the contents data receiver 103, the transmitter control part 109 performs a control to transmit the connection confirmation data for confirming the connection between the contents data transmitter 102 and the contents data receiver 103 through one or plural data lines. When receiving the connection confirmation response data transmitted from the contents data receiver 103 through the response line, the transmitter control part 109 judges that the contents data transmitter 102 is connected to the contents data receiver 103.

When the connection confirmation between the contents data transmitter 102 and the contents data receiver 103 is ended, the transmitter control part 109 performs a control to divide the receiver ID information which is extracted from the plural pieces of receiver ID information stored in the transmission ID storage part 107a of the transmitter ID authentication part 107 and is encrypted, to store the divided data respectively into the equipment authentication data composed of plural data rows, and to transmit the equipment authentication data from the transmitter transmission/reception part 108 through the first data line to the sixth data line to the contents data receiver 103.

As a result the transmitter ID authentication part 107 checks the receiver ID information stored in the equipment authentication response data transmitted from the contents data receiver 103 through the response line against the receiver ID information stored in the transmission ID storage part 107a, in the case where both of these pieces of receiver ID information are coincident with each other, the transmitter control part 109 ends the equipment authentication.

In the case where the receiver ID information transmitted from the contents data receiver 103 is not coincident with the receiver ID information stored in the transmission ID storage part 107a, the transmitter control part 109 performs a control to cause the transmitter ID authentication part 107 to extract receiver ID information other than the already extracted receiver ID information from the plural pieces of receiver ID information stored in the transmission ID storage part 107a and to encrypt it. Then, the transmitter control part 109 performs a control to divide the encrypted receiver ID information by the transmitter ID authentication part 107, to store the divided data respectively into the equipment authentication data composed of plural data rows, and to transmit it from the transmitter transmission/reception part 108 through the first data line to the sixth data line to the contents data receiver 103.

When the equipment authentication is ended, the transmitter control part 109 performs a control to divide the key information created and encrypted by the key information creation part 106, to store the divided data respectively into the key information transmission data composed of plural data rows, and to transmit the key information transmission data from the transmitter transmission/reception part 108 through the first data line to the sixth data line to the contents data receiver 103.

The transmitter control part 109 confirms whether or not information stored in the key information reception data transmitted from the contents data receiver 103 through the response line is information indicating that the contents data receiver 103 acquires the key information. In the case where the information stored in the key information reception data is the information indicating that the key information is not acquired, the transmitter control part 109 performs a control to again transmit the key information transmission data from the transmitter transmission/reception part 108 through the first data line to the sixth data line to the contents data receiver 103.

When confirming that the contents data receiver 103 acquires the key information, the transmitter control part 109 performs a control to divide the encrypted data encrypted by the contents encryption part 105, to store the divided data respectively into the contents transmission data composed of plural data rows, and to transmit the contents transmission data from the transmitter transmission/reception part 108 through the first data line to the sixth data line to the contents data receiver 103.

The contents data receiver 103 includes a receiver transmission/reception part 110, the receiver ID authentication part 111, the key information extraction part 112, a contents decryption part 113, an output part 114 and a receiver control part 115.

The receiver transmission/reception part 110 performs transmission/reception of data (connection confirmation data and connection confirmation response data) for connection confirmation between the contents data transmitter 102 and the contents data receiver 103, transmission/reception of data (equipment authentication data and equipment authentication response data) for equipment authentication, transmission/reception of data (key information transmission data and key information reception data) relating to the key information for breaking the encryption of the encrypted contents data, and transmission/reception of data (contents transmission data and contents reception data) relating to transmission/reception of the encrypted contents data.

Although described later, each of the equipment authentication response data, the key information reception data, and the contents reception data is composed of plural data rows. By the control of the receiver control part 115, the receiver transmission/reception part 109 performs a processing to divide each of data indicating whether or not the key information outputted from the key information extraction part 112 is acquired, data indicating whether or not the receiver ID information outputted from the transmitter ID authentication part 107 coincides, and data indicating whether or not the contents data outputted from the contents encryption part 105 is acquired, and to store the divided data respectively into the plural data rows included in the equipment authentication response data, the key information reception data, and the contents reception data, and transmits the respective data to the contents data transmitter 102.

The receiver ID authentication part 111 includes a reception ID storage part 111a for storing receiver ID information individually allocated to the contents data receiver. At the time of equipment authentication, the receiver ID authentication part 111 checks the receiver ID information transmitted from the contents data transmitter 102 against the receiver ID information stored in the reception ID storage part 111a, and notifies the receiver control part 115 of a check result.

In the case where the receiver ID information transmitted from the contents data transmitter 102 is coincident with the receiver ID information stored in the reception ID storage part 111a, by the control of the receiver control part 115, the receiver ID authentication part 111 encrypts the receiver ID information and outputs it to the receiver transmission/reception part 110. In the case where the receiver ID information transmitted from the contents data transmitter 102 is not coincident with the receiver ID information stored in the reception ID storage part 111a, the receiver ID authentication part 111 encrypts information (for example, data of "0") indicating the inconsistency of the receiver ID information and outputs it to the receiver transmission/reception part 110.

The key information extraction part 112 extracts the encrypted key information from information stored in the key information transmission data received by the receiver transmission/reception part 110, and decrypts the encrypted key information to acquire the key information. The key information extraction part 112 notifies the receiver control part 115 whether or not the key information could be acquired. In the case where the key information could be acquired by the control of the receiver control part 115, the key information extraction part 112 encrypts data of, for example, "1" as information indicating that the key information could be extracted and outputs it to the receiver transmission/reception part 110. In the case where the key information could not be acquired, the key information extraction part 112 encrypts data of, for example, "0" as information indicating that the key information could not be acquired and outputs it to the receiver transmission/reception part 110.

The contents decryption part 113 extracts the encrypted contents data from the contents transmission data received by the receiver transmission/reception part 110, and uses the key information extracted by the key information extraction part 112 to decrypt (break the encryption) the encrypted contents data.

The output part 114 digital-to-analog converts the contents data decrypted by the contents decryption part 113, and amplifies and outputs it to a speaker.

The receiver control part 115 comprehensively controls the contents data receiver 103. The receiver control part 115 controls transmission/reception of the connection confirmation data and the connection confirmation response data, transmission/reception of the equipment authentication data and the equipment authentication response data, transmission/reception of the key information transmission data and the key information reception data, and transmission/reception of the contents transmission data and the contents reception data in the receiver transmission/reception part 110.

When the receiver transmission/reception part 110 receives the connection confirmation data transmitted from the contents data transmitter 102, the receiver control part 115 performs a control to transmit the connection confirmation response data from the receiver transmission/reception part 110 through the response line to the contents data transmitter 102.

After the receiver ID authentication part 111 checks the receiver ID information of the equipment authentication data transmitted from the contents data transmitter 102 against the receiver ID information stored in the reception ID storage part 111*a*, the receiver control part 115 performs a control to transmit information indicating that both of these pieces of receiver ID information are coincident with each other or information indicating that both of these pieces of receiver ID information are not coincident with each other to the contents data transmitter 102.

In the case where both of these pieces of receiver ID information are coincident with each other, the receiver control part 115 performs a control to cause the receiver ID authentication part 111 to encrypt the receiver ID information, to divide the encrypted receiver ID information, to store the divided data respectively into the equipment authentication response data composed of plural data rows, and to transmit the equipment authentication response data from the receiver transmission/reception part 110 through the response line to the contents data transmitter 102.

In the case where both of these pieces of receiver ID information are not coincident with each other, the receiver control part 115 performs a control to encrypt information (for example, data of "0") indicating the inconsistency of the receiver ID information, to store the encrypted data respectively into the equipment authentication response data composed of plural data rows, and to transmit the equipment authentication response data from the receiver transmission/reception part 110 through the response line to the contents data transmitter 102.

The receiver control part 115 performs a control to confirm whether or not the key information extraction part 112 could acquire the key information from the key information transmission data transmitted from the contents data transmitter 102, and to transmit information indicating that the key information extraction part 112 could acquire the key information or the key information extraction part 112 could not acquire the key information to the contents data transmitter 102.

In the case where the key information extraction part 112 could acquire the key information, the receiver control part 115 performs a control to encrypt the information (for example, data of "1") indicating that the key information could be acquired, to divide the encrypted data, to store the divided data into the key information reception data composed of plural data rows, and to transmit the key information reception data from the receiver transmission/reception part 110 through the response line to the contents data transmitter 102.

In the case where the key information extraction part 112 could not acquire the key information, the receiver control part 115 performs a control to encrypt information (for example, data of "0") indicating that the key information could not be acquired, to divide the encrypted data, to store the divided data into the key information reception data composed of plural data rows, and to transmit the key information reception data from the receiver transmission/reception part 110 through the response line to the contents data transmitter 102.

When the key information extraction part 112 could acquire the key information and the contents transmission data is transmitted from the contents data transmitter 102, the receiver control part 115 performs a control to extract the encrypted contents data stored in the contents transmission data, and to decrypt the encrypted contents data in the contents decryption part 113 by using the key information.

The receiver control part 115 performs a control to confirm whether or not the contents decryption part 113 could acquire and decrypt the encrypted contents data from the contents transmission data transmitted from the contents data transmitter 102, and to transmit information indicating that the contents decryption part 113 could receive and decrypt the encrypted contents data or the contents decryption part 113 could not receive or could not decrypt the encrypted contents data to the contents data transmitter 102.

In the case where the contents decryption part 113 could receive and decrypt the encrypted contents data, the receiver control part 115 performs a control to encrypt information (for example, data of "1") indicating that the encrypted contents data could be received and decrypted, to divide the encrypted data, to store the divided data into the contents reception data composed of plural data rows, and to transmit the contents reception data from the receiver transmission/reception part 110 through the response line to the contents data transmitter 102.

In the case where the contents decryption part 113 could not receive or could not decrypt the encrypted contents data, the receiver control part 115 performs a control to encrypt information (for example, data of "0") indicating that the encrypted contents data could not be received or could not be encrypted, to divide the encrypted data, to store the divided data into the contents reception data composed of plural data rows, and to transmit the contents reception data from the receiver transmission/reception part 110 through the response line to the contents data transmitter 102.

The receiver control part 115 controls the output part 114 so that the contents data decrypted in the contents decryption part 113 is digital-to-analog converted, amplified and outputted.

Next, the data transmitted between the contents data transmitter 102 and the contents data receiver 103 will be described.

Figure 2A:
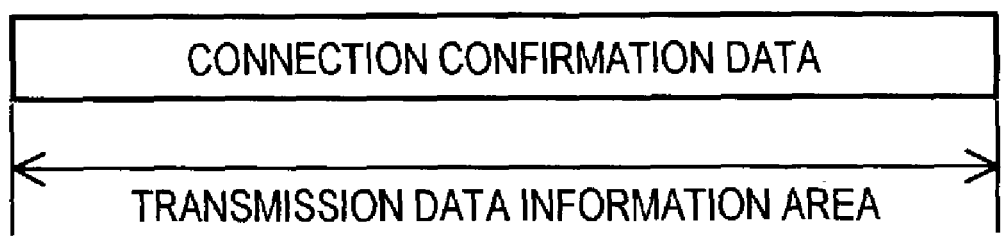
FIGS. 2A and 2B are views showing formats of connection confirmation data and connection confirmation response data in the contents data transmission/reception system of the embodiment.
Figure 2B:
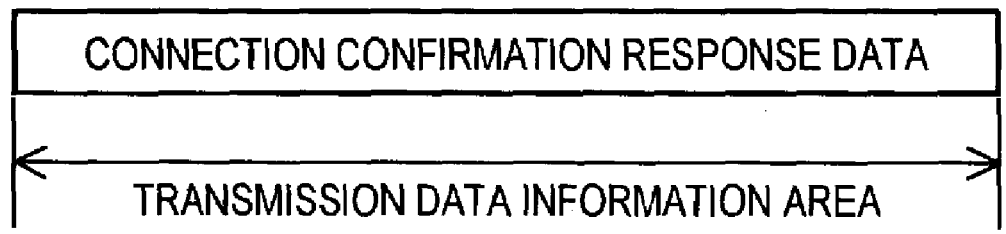

FIGS. 2A and 2B are views showing formats of the connection confirmation data and the connection confirmation response data in the contents data transmission/reception system 101 of this embodiment. FIG. 2A shows the connection confirmation data transmitted from the contents data transmitter 102 to the contents data receiver 103. FIG. 2B shows the connection confirmation response data transmitted from the contents data receiver 103 to the contents data transmitter 102.

As shown in FIG. 2A, the connection confirmation data includes a transmission data information area. Information indicating that the data is data (connection confirmation data) for connection confirmation is stored in the transmission data information area. The contents data transmitter 102 transmits the connection confirmation data shown in FIG. 2A through the plural data lines, respectively, to the contents data receiver 103. In this embodiment, although the connection confirmation data is transmitted through the plural data lines respectively, it may be transmitted through only one data line of the plural data lines.

As shown in FIG. 2B, the connection confirmation response data includes a transmission data information area. Information indicating that the data is response data (connection confirmation response data) to the connection confirmation data is stored in the transmission data information area. When the connection confirmation data shown in FIG. 2A is transmitted from the contents data transmitter 102 through the data lines, the contents data receiver 103 transmits the connection confirmation response data shown in FIG. 2B through the response line to the contents data transmitter 102.

In the case where the connection confirmation response data is not transmitted from the contents data receiver 103 after the connection confirmation data is transmitted to the contents data receiver 103, the contents data transmitter 102 judges that a connection with the contents data receiver 103 is not established, and again performs transmission after a definite time.

FIGS. 3A and 3B are views showing the equipment authentication data and the equipment authentication response data in the contents data transmission/reception system of this embodiment. FIG. 3A shows the equipment authentication data transmitted from the contents data transmitter to the contents data receiver. FIG. 3B shows the equipment authentication response data transmitted from the contents data receiver to the contents data transmitter.

As shown in FIG. 3A, the equipment authentication data is composed of a first data row, a second data row, ... , a sixth data row. Each of the data rows includes a data area for storing divided information of the encrypted receiver ID information and a transmission data information area for storing information relating to the equipment authentication data.

Specifically, in the first data row, the first data area stores any one piece of information (first ID information) of six pieces of information obtained by dividing the encrypted receiver ID information. The first transmission data information area stores information indicating that the data rows composed of the first data row to the sixth data row are equipment authentication data.

In the second data row to the sixth data row, each of the second data area to the sixth data area stores a piece of information (second ID information to the sixth ID information) of the six pieces of information obtained by dividing the encrypted receiver ID information. The second transmission data information area to the sixth transmission data information area store the transmission data confirmation information indicating that the equipment authentication data is composed of the first data row to the sixth data row.

The transmission data confirmation information is, for example, a checksum value. The checksum value is a value indicating a result of addition of respective bit numbers in respective byte units after data is divided in one byte (8 bits) units. In this embodiment, it is assumed that the second data row stores a checksum value of data stored in the data areas of the first data row and the second data row, and a checksum value of data stored in the data areas of the first data row to the sixth data row, and each of the third data row to the sixth data row stores a checksum value of data stored in the data area of the respective data row and a checksum value of data stored in the data areas of the first data row to the sixth data row. The contents data receiver 103 confirms the checksum value of the transmission data confirmation information and confirms whether or not all the equipment authentication data composed of the plural data rows could be received.

Incidentally, in this embodiment, although the first transmission data information area of the first data row stores the information indicating that the data rows of the first data row to the sixth data row are the equipment authentication data, and the second transmission data information area of the second data row to the sixth transmission data information area of the sixth data row store the transmission data confirmation information, the invention is not limited thereto. For example, the information indicating that the data rows of the first data row to the sixth data row are the equipment authentication data may be stored in the first transmission data information area of the first data row to the fifth transmission data information area of the fifth data row, and the sixth transmission data information area of the sixth data row may store the transmission data confirmation information (checksum value of the first data row to the sixth data row) of the first data row to the sixth data row.

The contents data transmitter 102 encrypts the receiver ID information stored in the transmission ID storage part 107a, divides the encrypted receiver ID information, stores the first ID information to the sixth ID information into the first data area of the first data row to the sixth data area of the sixth data row shown in FIG. 3A, and transmits the first data row to the sixth data row through the first data line to the sixth data line to the contents data receiver 103 at the same time.

As shown in FIG. 3B, the equipment authentication response data is composed of a first data row, a second data row, ... , a sixth data row. Each of the data rows includes a data area for storing a piece of information of divided information relating to whether or not the pieces of receiver ID information are coincident with each other in the contents data receiver 103, and a transmission data information area for storing information relating to the equipment authentication response data.

Specifically, the first data area of the first data row stores any one piece of information (first ID information) of six pieces of information obtained by dividing the encrypted receiver ID information. The first transmission data information area stores information indicating that the data rows of the first data row to the sixth data row are the equipment authentication response data.

Each of the second data area of the second data row to the sixth data area of the sixth data row stores a piece of information (second ID information to the sixth ID information) of the six pieces of information obtained by dividing the encrypted receiver ID information. The second transmission data information area to the sixth transmission data information area store the transmission data confirmation information indicating that the equipment authentication response data is composed of the first data row to the sixth data row. The transmission data confirmation information is, for example, a checksum value similarly to the second data row to the sixth data row of the equipment authentication data.

Incidentally, in this embodiment, although the first transmission data information area of the first data row stores the information indicating that the data rows of the first data row to the sixth data row are the equipment authentication response data, and the second transmission data information area to the sixth transmission data information area of the second data row to the sixth data row store the transmission data confirmation information, the invention is not limited thereto. For example, the information indicating that the data rows of the first data row to the sixth data row are the equipment authentication response data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

In the case where the receiver ID information transmitted by the contents data transmitter 102 is coincident with the receiver ID information allocated to the contents data receiver 103, the information indicating whether or not both pieces of receiver ID information are coincident with each other in the contents data receiver 103 is the encrypted information of the receiver ID information stored in the reception ID storage part 111a of the contents data receiver 103. The information is divided, and the divided first ID information to the sixth ID information are stored in the first data area of the first data row to the sixth data area of the sixth data row, respectively.

In the case where the receiver ID information transmitted by the contents data transmitter 102 is not coincident with the receiver ID information allocated to the contents data receiver 103, the information relating to whether or not both pieces of receiver ID information are coincident with each other in the contents data receiver 103 is data of all "0" and the data of "0" is stored in the first data area of the first data row to the sixth data area of the sixth data row.

In this embodiment, in the case where the receiver ID information transmitted by the contents data transmitter 102 is coincident with the receiver ID information allocated to the contents data receiver 103, the information relating to whether or not both pieces of receiver ID information are coincident with each other in the contents data receiver 103 is the encrypted receiver ID information, however, other information (for example, data of all "1") may be adopted. Besides, in this embodiment, in the case where the receiver ID information transmitted by the contents data transmitter 102 is not coincident with the receiver ID information allocated to the contents data receiver 103, the information relating to whether or not both pieces of receiver ID information are coincident with each other in the contents data receiver 103 is made the data of all "0", however, other information (for example, data of "101010 . . . ") may be adopted.

When receiving the equipment authentication data transmitted from the contents data transmitter 102, the contents data receiver 103 extracts the first ID information to the sixth ID information stored in the first data row to the sixth data row, decrypts these pieces of information to acquire the receiver ID information, and checks it against the receiver ID information stored in the reception ID storage part 111a of the receiver ID authentication part 111. In the case where the receiver ID information transmitted from the contents data transmitter 102 is coincident with the receiver ID information stored in the reception ID storage part 111a, the contents data receiver 103 encrypts and divides the receiver ID information stored in the reception ID storage part 111a, stores it into the first data area of the first data row to the sixth data area of the sixth data row shown in FIG. 3B, and sequentially transmits the first data row to the sixth data row through the response line to the contents data transmitter 102.

The transmission of the equipment authentication response data from the contents data receiver 103 to the contents data transmitter 102 may be sequentially performed at predetermined time intervals in such a manner that after the first data row is transmitted, the second data row is transmitted after a predetermined time has passed.

In the case where as the equipment authentication response data, the first data row to the sixth data row are continuously transmitted through the response line, it becomes easy to extract the first data row to the sixth data row as one data row from the response line, and it becomes easy to obtain the receiver ID information of the equipment from the extracted data. Then, an equipment (for example, a personal computer) other than the equipment set by the receiver ID information is connected to the DVD player, the personal computer is made to be recognized as the AV amplifier by using the extracted receiver ID information to obtain the key information and the encrypted contents data, the encrypted contents data is decrypted by the key information, and the decrypted contents data can be illegally copied and recorded.

Thus, the first data row to the sixth data row are transmitted at predetermined intervals in such a manner that after the first data row of the equipment authentication response data is transmitted, the second data row is transmitted after a predetermined time has passed, so that it becomes possible to make difficult extract the ID information as one data row from the response line.

Figure 4B:
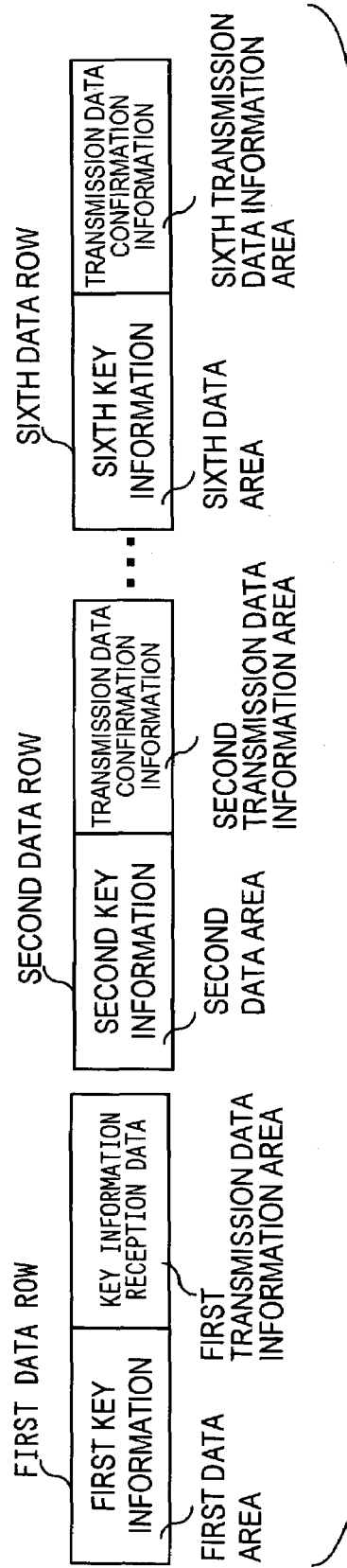

FIGS. 4A and 4B are views showing formats of the key information transmission data and the key information reception data in the contents data transmission/reception system of this embodiment. FIG. 4A shows the key information transmission data transmitted from the contents data transmitter to the contents data receiver. FIG. 4B shows the key information reception data transmitted from the contents data receiver to the contents data transmitter.

As shown in FIG. 4A, the key information transmission data is composed of a first data row, a second data row, . . . , a sixth data row. Each of the data rows includes a data area for storing any one piece of information of plural pieces of information obtained by dividing the encrypted key information, and a transmission data information area for storing information relating to the key information transmission data.

Specifically, the first data area of the first data row stores any one piece of information (first key information) of six pieces of information obtained by dividing the encrypted key information. The first transmission data information area stores information indicating that the data rows of the first data row to the sixth data row are the key information transmission data.

Each of the second data area of the second data row to the sixth data area of the sixth data row stores a piece of information (second key information to sixth key information) of the six pieces of information obtained by dividing the encrypted key information. The second transmission data information area to the sixth transmission data information area store the transmission data confirmation information indicating that the key information transmission data is composed of the first data row to the sixth data row.

The transmission data confirmation information is, for example, a checksum value similarly to the second data row to the sixth data row of the equipment authentication data. The contents data receiver 103 confirms the checksum value of the transmission data confirmation information and confirms whether or not all the key information transmission data composed of the plural data rows could be received.

Incidentally, in this embodiment, the first transmission data information area of the first data row stores the information indicating that the data rows of the first data row to the sixth data row are the key information transmission data, and the second transmission data information area to the sixth transmission data information area of the second data row to the sixth data row store the transmission data confirmation information, however, the invention is not limited thereto. For example, the information indicating that the data rows of the first data row to the sixth data row are the key information transmission data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

As shown in FIG. 4A, the contents data transmitter 102 stores the six pieces of information obtained by dividing the encrypted key information into the first data area of the first data row to the sixth data area of the sixth data row, and the first data row to the sixth data row are transmitted through the first data line to the sixth data line to the contents data receiver 103 at the same time.

As shown in FIG. 4B, the key information reception data is composed of a first data row, a second data row, . . . , a sixth data row. Each of the data rows includes a data area for storing any one of plural pieces of information obtained by encrypting information indicating whether or not the key information is acquired and by dividing the encrypted information, and a transmission data information area for storing information relating to the key information reception data.

Specifically, the first data area of the first data row stores any one piece of information (first key information) of six pieces of information obtained by dividing the information indicating whether or not the key information is acquired. The first transmission data information area stores information indicating that the data rows of the first data row to the sixth data row are the key information reception data.

Each of the second data area of the second data row to the sixth data area of the sixth data row store a piece of information (second key information to the sixth key information) of the six pieces of information obtained by dividing the information indicating whether or not the key information is acquired. The second transmission data information area to the sixth transmission data information area store the transmission data confirmation information indicating that the key information reception data is composed of the first data row to the sixth data row. The transmission data confirmation information is, for example, a checksum value similarly to the second data row to the sixth data row of the equipment authentication data.

The information indicating whether or not the key information is acquired is, for example, data of all "1" in the case where the contents data receiver 103 acquired the key information, and data of all "0" in the case where the contents data receiver 103 could not acquire the key information.

Incidentally, in this embodiment, the first transmission data information area of the first data row stores the information indicating that the data rows of the first data row to the sixth data row are the key information reception data, and the second transmission data information area to the sixth transmission data information area of the second data row to the sixth data row store the transmission data confirmation information, however, the invention is not limited thereto. For example, the information indicating that the data rows of the first data row to the sixth data row are the key information reception data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

In the case where the key information transmitted by the contents data transmitter 102 could be acquired, the contents data receiver 103 stores data of "1" into all bits of the first data area of the first data row to the sixth data area of the sixth data row, and sequentially transmits the first data row to the sixth data row to the contents data transmitter 102 through the response line.

In the case where the key information transmitted by the contents data transmitter 102 could not be acquired, the contents data receiver 103 stores data of "0" into all bits of the first data area of the first data row to the sixth data area of the sixth data row, and sequentially transmits the first data row to the sixth data row to the contents data transmitter 102 through the response line.

In this embodiment, the information relating to the acquisition of the key information is made the data of all "1" in the case where the contents data receiver 103 acquired the key information, and is made the data of all "0" in the case where the contents data receiver 103 could not acquire the key information, however, the invention is not limited thereto. Data of another pattern may be adopted as long as the case where the key information could be acquired can be discriminated from the case where the key information could not be acquired. For example, in the case where the contents data receiver 103 acquired the key information, bits of the half of each data area of the first data area of the first data row to the sixth data area of the sixth data row are made data of "1", and bits of the remaining half are made data of "0".

Besides, when the contents data receiver 103 transmits the key information reception data to the contents data transmitter 102 through the response line, similarly to the foregoing equipment authentication response data, the contents data receiver 103 may sequentially transmit the first data row to the sixth data row at predetermined time intervals.

Besides, in this embodiment, although the key information reception data is composed of the plural data rows, it may be one data row composed of a data area for storing information indicating whether or not the key information is acquired, and a transmission data information area for storing information indicating that the data row is the key information reception data.

Figure 5B:
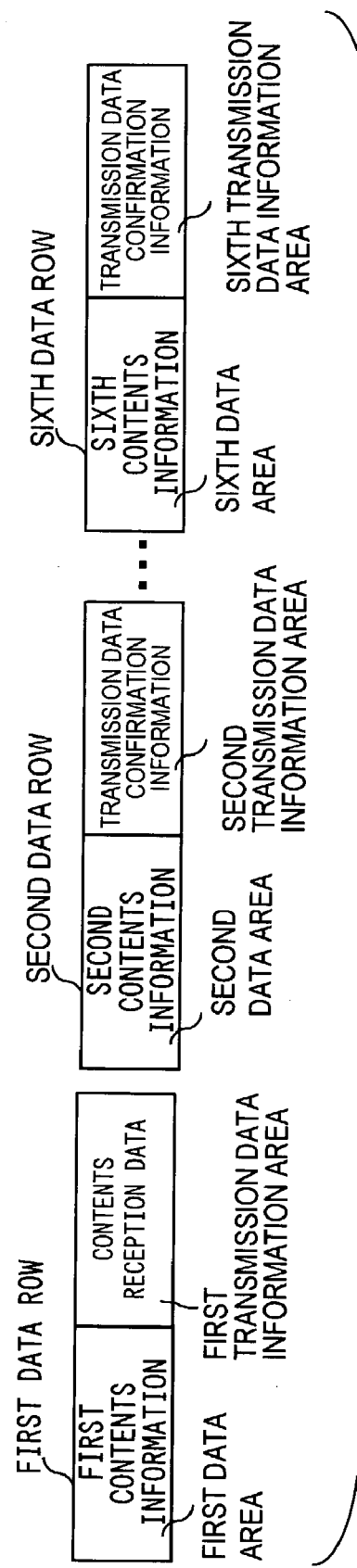

FIGS. 5A and 5B are views showing formats of the contents transmission data and the contents reception data in the contents data transmission/reception system of this embodiment. FIG. 5A shows the contents transmission data transmitted from the contents data transmitter to the contents data receiver. FIG. 5B shows the contents reception data transmitted from the contents data receiver to the contents data transmitter.

As shown in FIG. 5A, the contents transmission data is composed of a first data row, a second data row, . . . , a sixth data row. Each of the data row includes a data area where any one piece of information of plural pieces of information obtained by dividing the encrypted contents data is stored, and a transmission data information area for storing information relating to the contents transmission data.

Specifically, the first data area of the first data row stores any one piece of information (first contents data) of six pieces of information obtained by dividing the encrypted contents data. The first transmission data information area stores information indicating that the data rows of the first data row to the sixth data row are the contents transmission data.

Each of the second area to the sixth area of the second data row to the sixth data row stores a piece of information (second contents information to the sixth contents information) of the six pieces of information obtained by dividing the encrypted contents data. The second transmission data information area to the sixth transmission data information area store the transmission data confirmation information indicating that the contents transmission data is composed of the first data row to the sixth data row.

The transmission data confirmation information is, for example, a checksum value similarly to the second data row to the sixth data row of the key information transmission data. The contents data receiver 103 confirms the checksum value of the transmission data confirmation information to confirm whether or not all the contents transmission data composed of the plural data rows could be received.

Incidentally, in this embodiment, the first transmission data information area of the first data row stores the information indicating that the data rows of the first data row to the sixth data row are the contents transmission data, and the second transmission data information area to the sixth transmission data information area of the second data row to the sixth data row store the transmission data confirmation information, however, the invention is not limited thereto. For example, the information indicating that the data rows of the first data row to the sixth data row are the contents transmission data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

In this embodiment, although the encrypted contents data is divided and the respective pieces of divided information are stored in the respective data areas of the respective data rows, the invention is not limited thereto. For example, in the case where the contents data is multi-channel audio data, the audio data of L, R, surround L, surround R, center, and subwoofer are encrypted for the respective channels, become data of encrypted L, encrypted R, encrypted surround L, encrypted surround R, encrypted center, and encrypted subwoofer, and the encrypted contents data may be stored in the first data area to the sixth data area of the first data row to the sixth data row, respectively.

As shown in FIG. 5A, the contents data transmitter 102 stores the encrypted contents data into the first data area of the first data row to the sixth data area of the sixth data row, respectively, and transmits the first data row to the sixth data row through the first data line to the sixth data line to the contents data receiver 103 at the same time.

In this embodiment, the transmission of the encrypted contents data from the contents data transmitter 102 to the contents data receiver 103 is performed as described above in such a manner that the encrypted contents data are stored in the data rows composed of the data areas and the transmission data information areas, and the first data row to the sixth data row are transmitted at once. However, a method may be adopted in which a data row composed of only the transmission data information area is first transmitted as a header, and subsequently to the data row, a data row composed of only the data area is transmitted.

In this case, in the second and the following transmission of the contents transmission data, since the data amount of the encrypted contents data which can be transmitted at a time is larger than the data amount of the encrypted contents data transmitted in the format of FIG. 5A, a large amount of encrypted contents data can be transmitted from the contents data transmitter 102 to the contents data receiver 103 in a shorter time.

As shown in FIG. 5B, the contents reception data is composed of a first data row, a second data row, . . . , a sixth data row. Each of the data rows includes a data area for storing a piece of information of plural pieces of information obtained by encrypting information indicating whether or not the encrypted contents data could be received and by dividing the encrypted information, and a transmission data information area for storing information relating to the contents reception data.

Specifically, the first data area of the first data row stores any one piece of information (first contents information) of six pieces of information obtained by dividing the information indicating whether or not the encrypted contents data could be received. The first transmission data information area stores information indicating that the data rows of the first data row to the sixth data row are the contents reception data.

Each of the second data area of the second data row to the sixth data area of the sixth data row stores a piece of information (second contents information to sixth contents information) of the six pieces of information obtained by dividing the information indicating whether or not the encrypted contents data could be received. The second transmission data information area to the sixth transmission data information area store the transmission data confirmation information indicating that the contents reception data is composed of the first data row to the sixth data row. The transmission data confirmation information is, for example, a checksum value similarly to the second data row to the sixth data row of the key information reception data.

Incidentally, in this embodiment, the first transmission data information area of the first data row stores the information indicating that the data rows of the first data row to the sixth data row are the contents reception data, and the second transmission data information area to the sixth transmission data information area of the second data row to the sixth data row store the transmission data confirmation information, however, the invention is not limited thereto. For example, the information indicating that the data rows of the first data row to the sixth data row are the contents reception data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

The information indicating whether or not the encrypted contents data could be received is, for example, data of all "1" in the case where the contents data receiver 103 received the encrypted contents data, and data of all "0" in the case where the contents data receiver 103 could not receive the encrypted contents data.

In the case where the contents data receiver 103 could receive encrypted contents data transmitted by the contents data transmitter 102 could be receive, the contents data receiver 103 stores the data of "1" into all bits of the first data area of the first data row to the sixth data area of the sixth data row, and sequentially transmits the first data row to the sixth data row to the contents data transmitter 102 through the response line.

In the case where the contents data receiver 103 could not receive the encrypted contents data transmitted by the contents data transmitter 102, the contents data receiver 103 stores the data of "0" into all bits of the first data area of the first data row to the sixth data area of the sixth data row, and sequentially transmits the first data row to the sixth data row to the contents data transmitter 102 through the response line.

In this embodiment, the information relating to the acquisition of the key information is made the data of all "1" in the case where the contents data receiver 103 received the encrypted contents data, and the data of all "0" in the case where the contents data receiver 103 could not receive the encrypted contents data, however, the invention is not limited thereto. Data of another pattern may be adopted as long as the case where the encrypted contents data could be received can be discriminated from the case where the encrypted contents data could not be received. For example, in the case where the contents data receiver 102 received the encrypted contents data, bits of the half of each data area of the first data area of the first data row to the sixth data area of the sixth data row are made data of "1", and bits of the remaining half are made data of "0".

Besides, similarly to the foregoing equipment authentication response data, the contents data receiver 103 may sequentially transmit the first data row to the sixth data row at predetermined time intervals when the contents data receiver 103 transmits the contents reception data to the contents data transmitter 102 through the response line.

Besides, in this embodiment, although the contents reception data is composed of the plural data row, it may be one data row composed of a data area for storing the information indicating whether or not the encrypted contents data could be received, and a transmission data information area for storing the information indicating that the data row is the contents reception data.

Besides, in this embodiment, although the contents reception data is transmitted to the contents data transmitter 102 each time the contents data receiver 103 receives the contents transmission data, the invention is not limited thereto. The contents data receiver 103 may transmit the contents reception data to the contents data transmitter 102 at predetermined time intervals after the contents data transmitter 102 starts to transmit the contents transmission data. Alternatively, the contents data receiver 103 may transmit the contents reception data to the contents data transmitter 102 after the contents data transmitter 102 starts to transmit the contents transmission data and in the case where an interval for reception of the contents transmission data exceeds a predetermined time.

Next, the flow of transmission/reception of data in the contents data transmission/reception system of this embodiment will be described.

Figure 6:
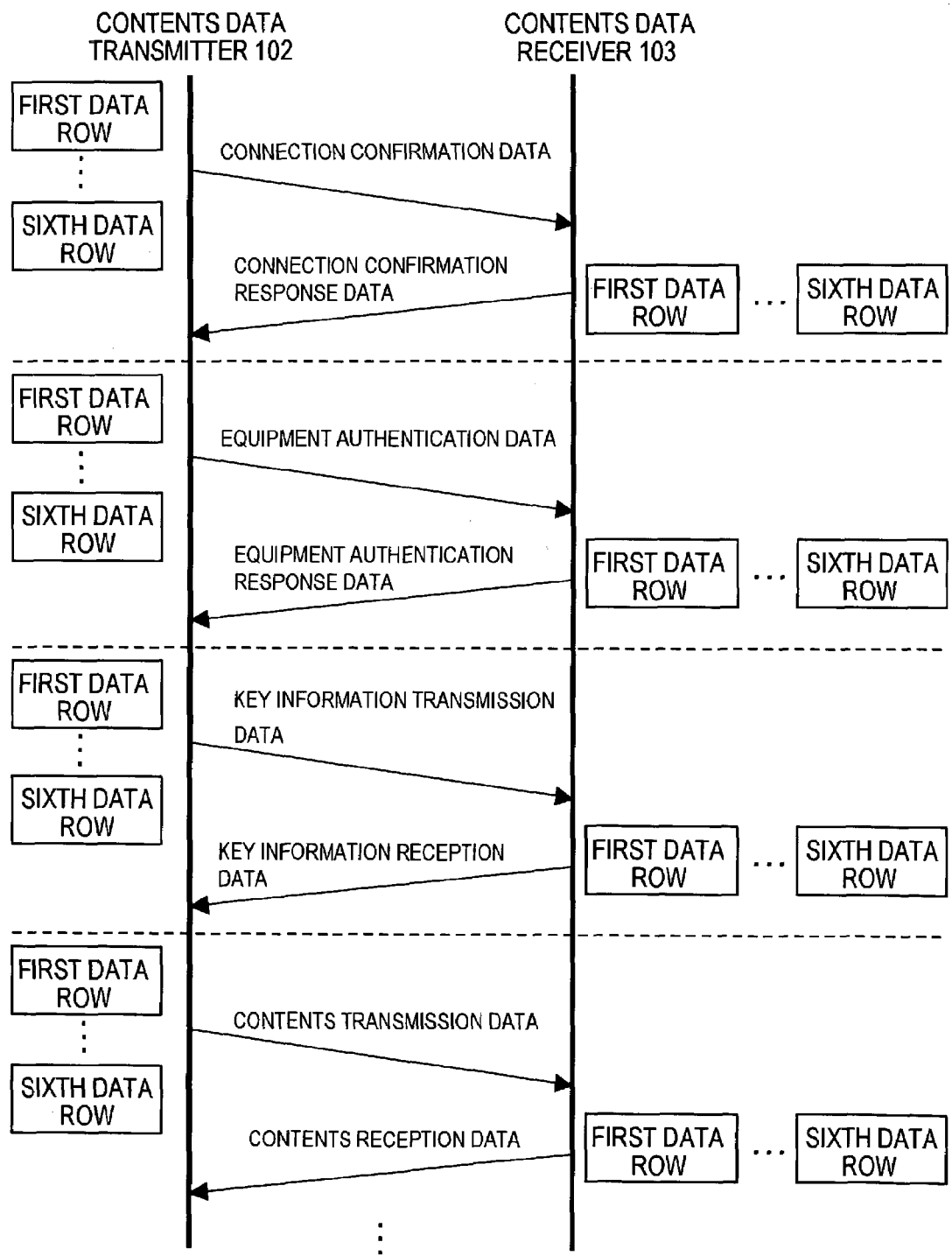
FIG. 6 is a view for explaining an embodiment of a contents data transmission/reception method of the invention.

FIG. 6 is a view for explaining an embodiment of a contents data transmission/reception method of the invention. In FIG. 6, the vertical axis of the drawing indicates the flow of time.

In order to confirm whether or not the contents data transmitter 102 and the contents data receiver 103 are connected with each other through the signal lines, the contents data transmitter 102 transmits the connection confirmation data shown in FIG. 2A from the transmitter transmission/reception part 108 through the first data line to the sixth data line to the contents data receiver 103.

When the receiver transmission/reception part 110 receives the connection confirmation data transmitted from the contents data transmitter 102, the contents data receiver 103 transmits the connection confirmation response data shown in FIG. 2B from the receiver transmission/reception part 110 through the response line to the contents data transmitter 102.

When the transmitter transmission/reception part 108 receives the connection confirmation response data transmitted from the contents data receiver 103, the contents data transmitter 102 extracts one piece of receiver ID information from the plural pieces of receiver ID information individually allocated to the respective contents data receivers stored in the transmission ID storage part 107a of the transmitter ID authentication part 107, encrypts the extracted receiver ID information, divides the encrypted receiver ID information, stores it into the equipment authentication data shown in FIG. 3A, and transmits it from the transmitter transmission/reception part 108 through the first data line to the sixth data line to the contents data receiver 103.

When the receiver transmission/reception part 110 receives the equipment authentication data transmitted from the contents data transmitter 102, the contents data receiver 103 extracts the receiver ID information stored in the ID information area from the equipment authentication data, decrypts the extracted receiver ID information, and checks the decrypted receiver ID information against the receiver ID information stored in the reception ID storage part 111a of the receiver ID authentication part 111.

In the case where the receiver ID information extracted from the equipment authentication data is coincident with the receiver ID information stored in the reception ID storage part 111a, the contents data receiver 103 encrypts the receiver ID information, divides the encrypted data, stores it into the equipment authentication response data shown in FIG. 3B, and transmits it from the receiver transmission/reception part 110 through the response line to the contents data transmitter 102.

In the case where the receiver ID information extracted from the equipment authentication data is not coincident with the receiver ID information stored in the reception ID storage part 111a, the contents data receiver 103 encrypts information (for example, data of all "0") indicating that both of these pieces of reception ID information are not coincident with each other, divides the encrypted data, stores it into the equipment authentication response data shown in FIG. 3B, and transmits it from the receiver transmission/reception part 110 through the response line to the contents data transmitter 102.

When the transmitter transmission/reception part 108 receives the equipment authentication response data transmitted from the contents data receiver 103, the contents data transmitter 102 extracts the data stored in the equipment authentication response data, and confirms from the data whether or not the pieces of receiver ID information are coincident with each other in the contents data receiver 103.

In the case where the data obtained from the equipment authentication response data is information indicating that the pieces of receiver ID information are coincident with each other in the contents data receiver 103, the contents data transmitter 102 starts to reproduce the contents data in the contents reproduction part 104, and the key information creation part 106 starts a processing to encrypt the contents data by using the key information in the contents encryption part 105.

The contents data transmitter 102 starts to encrypt the contents data, and at the same time, encrypts the key information created by the key information creation part 106, divides the encrypted data, stores it into the key information transmission data shown in FIG. 4A, and transmits it from the transmitter transmission/reception part 108 through the first data line to the sixth data line to the contents data receiver 103.

In the case where the data obtained from the equipment authentication response data is information indicating that the pieces of receiver ID information are not coincident with each other in the contents data receiver 103, the contents data transmitter 102 extracts one piece of receiver ID information from the plural pieces of receiver ID information, which are stored in the transmission ID storage part 107a of the transmitter ID authentication part 107, except for the receiver ID information already transmitted to the contents data receiver 103, encrypts the receiver ID information, divides the encrypted data, stores it into the equipment authentication data shown in FIG. 3A, and again transmits it from the transmitter transmission/reception part 108 through the first data line to the sixth data line to the contents data transmitter 103. The contents data transmitter 102 repeats this processing until the transmitted receiver ID information is coincident with the receiver ID information allocated to the contents data receiver 103.

When the receiver transmission/reception part 110 receives the key information transmission data transmitted from the contents data transmitter 102, the contents data receiver 103 extracts the data stored in the key information area from the key information transmission data, decrypts the extracted data and acquires the key information. This key information becomes encryption breaking information for breaking the encryption of the encrypted contents data.

In the case where the key information could be acquired from the key information transmission data, the contents data receiver 103 encrypts information (for example, data of all "1") indicating that the key information was acquired, divides the encrypted data, stores it into the key information reception data shown in FIG. 4B, and transmits it from the receiver transmission/reception part 110 through the response line to the contents data transmitter 103.

In the case where the key information could not be acquired from the key information transmission data, the contents data receiver 103 encrypts information (for example, data of all "0") indicating that the key information could not be acquired, divides the encrypted data, stores it into the key information reception data shown in FIG. 4B, and transmits it from the receiver transmission/reception part 110 through the response line to the contents data transmitter 102.

When the transmitter transmission/reception part 108 receives the key information reception data transmitted from the contents data receiver 103, the contents data transmitter 103 extracts the data stored in the reception data area of the key information reception data, and confirms whether or not the contents data receiver 103 acquired the key information.

In the case where the key information could not be acquired in the contents data receiver 103, the contents data transmitter 102 again transmits the key information transmission data from the transmitter transmission/reception part 108 through the first data line to the sixth data line to the contents data receiver 103.

In the case where the key information could be acquired in the contents data receiver 103, the contents data transmitter 102 divides the encrypted contents data encrypted by the contents encryption part 105, stores the divided data into the contents transmission data shown in FIG. 5A, and transmits it from the transmitter transmission/reception part 108 through the first data line to the sixth data line to the contents data receiver 103.

In the case where the key information could not be acquired in the contents data receiver 103, the contents data receiver 103 encrypts information (for example, data of all "0") indicating that the contents data could not be acquired, divides the encrypted data, stores it into the contents reception data shown in FIG. 5B, and transmits it from the receiver transmission/reception part 110 through the response line to the contents data transmitter 102.

When the receiver transmission/reception part 110 receives the contents transmission data transmitted from the contents data transmitter 102, the contents data receiver 103 extracts the encrypted contents data stored in the contents transmission data, decrypts the encrypted contents data by using the key information extracted by the key information extraction part 112 in the contents decryption part 113, and outputs it to the output part 114.

The output part 114 performs digital-to-analog conversion, amplification and the like to the contents data outputted from the contents decryption part 113 and outputs it.

When receiving the contents transmission data transmitted by the contents data transmitter 102 and decrypting the encrypted contents data, the contents data receiver 103 encrypts information indicating that the encrypted contents data was acquired, divides the encrypted data, stores it into the contents reception data shown in FIG. 5B, and transmits it from the receiver transmission/reception part 110 through the response line to the contents data transmitter 102.

When receiving the contents reception data transmitted from the contents data receiver 103, the contents data transmitter 102 confirms, from the information indicating that the contents data stored in the contents reception data was acquired, whether or not the contents data receiver 103 could acquire the contents data.

In the case where the contents data receiver 103 could acquire the contents data, the contents data transmitter 102 stores next encrypted contents data into the contents transmission data shown in FIG. 5A, and transmits the contents transmission data from the transmitter transmission/reception part 108 through the first data line to the sixth data line to the contents data receiver 103.

In the case where the contents data receiver 103 could not receive the contents data, the contents data transmitter 102 again transmits the transmitted contents transmission data from the transmitter transmission/reception part 108 through the first data line to the sixth data line to the contents data receiver 103.

In this way, the contents data is transmitted from the contents data transmitter 102 to the contents data receiver 103.

As described above, in the contents data transmission/reception system, the contents data transmitter 102 encrypts the receiver ID information for performing the equipment authentication, the key information for decrypting the encrypted contents data, and the contents data, stores the encrypted data into the respective data composed of the plural data rows, and transmits the data to the contents data receiver 103 by using the plural signal lines.

From this, since the receiver ID information, the key information, and the encrypted contents data outputted by the contents data transmitter 102 can not be acquired from a single signal line, it is possible to prevent the contents data from being illegally copied by illegally obtaining the receiver ID information, the key information and the encrypted contents data to decrypt the encrypted contents data by using the key information.

In the foregoing embodiment, although the description has been made on the premise that the signal lines for transmitting data from the contents data transmitter 102 to the contents data receiver 103 are the six signal lines (the first data line to the sixth data line), as long as plural signal lines not less than two lines are used, any number of signal lines may be used.

When the number of signal lines for transmitting data from the contents data transmitter 102 to the contents data receiver 103 becomes large, the number of divided parts of the receiver ID information and the key information is increased, and therefore, it is possible to make it difficult to illegally acquire the receiver ID information and the key information from the signal lines. Besides, it is possible to make it difficult to acquire the encrypted contents data similarly, and at the same time, it also becomes possible to transmit audio data with more channels.

Besides, in the foregoing embodiment, when the connection confirmation data, the equipment authentication data, the key transmission data, and the contents transmission data are transmitted from the contents data transmitter 102 to the contents data receiver 103, the contents data transmitter 102 transmits the plural data rows at the same time. However, the plural data rows may be transmitted while a time difference is provided. That is, after the first data row is transmitted, the second data row is transmitted after a predetermined time has passed, and similarly, the third data row to the sixth data row may be transmitted while a time difference is provided.

By this, even if the data transmitted by the contents data transmitter 102 are received at the same time, and rearrangement of pieces of information stored in the data received at the same time is merely performed, it becomes difficult to acquire correct information (for example, the receiver ID information, the key information, etc.) from the information stored in the data. Accordingly, it is possible to prevent the contents data from illegally copied by illegally acquiring the receiver ID information, the key information, and the encrypted contents data outputted by the contents data transmitter 102 and by decrypting the encrypted contents data by using the data.

According to this invention, it is possible to provide the contents data transmission/reception system in which it is difficult to extract and decrypt the encryption breaking information for decrypting the encrypted contents data transmitted and received between plural apparatuses, the contents data transmitter, the contents data receiver, and the contents data transmission/reception method.

What is claimed is:

1. A contents data transmission/reception system comprising a contents data transmitter for transmitting contents data, and a contents data receiver for receiving the contents data, wherein the contents data transmitter encrypts the contents data by using key information, transmits the key information through parallel signal lines to the contents data receiver, and then, transmits the encrypted contents data through the parallel signal lines to the contents data receiver, and the contents data receiver acquires the key information from data transmitted from the contents data transmitter through the parallel signal lines, receives the encrypted contents data transmitted from the contents data transmitter through the parallel signal lines, and decrypts the encrypted contents data by using the key information.

2. A contents data transmission/reception system according to claim 1, wherein the parallel signal lines comprise channels of an audio data transmission path and the contents data comprises multi-channel audio data.

3. A contents data transmission/reception system comprising a contents data transmitter for transmitting contents data, and a contents data receiver for receiving the contents data, wherein the contents data transmitter includes:

a contents reproduction part for reproducing the contents data;

a key information creation part for creating key information for encrypting the contents data;

a contents encryption part for encrypting the contents data reproduced by the contents data reproduction part by using the key information;

a transmitter transmission/reception part for transmitting the key information through parallel signal lines to the contents data receiver and transmitting the encrypted contents data through the parallel signal lines to the contents data receiver; and a transmitter control part for performing a control to transmit the encrypted contents data through the parallel signal lines to the contents data receiver after the key information is transmitted by the transmitter transmission/reception part through the parallel signal lines, and wherein the contents data receiver includes:

a receiver transmission/reception part for receiving data transmitted from the contents data transmitter through the parallel signal lines;

a key information extraction part for extracting the key information from the data received by the receiver transmission/reception part;

a contents decryption part for extracting the encrypted contents data from the data received by the receiver transmission/reception part and decrypting the encrypted contents data by using the key information extracted by the key information extraction part;

an output part for outputting the contents data decrypted by the contents decryption part; and a receiver control part for performing a control to extract the key information from the data received by the receiver transmission/reception part and to decrypt the encrypted contents data received by the receiver transmission/reception part.

4. A contents data transmission/reception system according to claim 3, wherein the parallel signal lines comprise channels of an audio data transmission path and the contents data comprises multi-channel audio data.

5. A contents data transmission/reception system comprising a contents data transmitter for transmitting contents data, and a contents data receiver for receiving the contents data, wherein the contents data transmitter includes:
a contents reproduction part for reproducing the contents data;
a key information creation part for creating key information for encrypting the contents data;
a contents encryption part for encrypting the contents data reproduced by the contents data reproduction part by using the key information;
a transmitter transmission/reception part for transmitting the key information through plural signal lines to the contents data receiver and transmitting the encrypted contents data through the plural signal lines to the contents data receiver; and
a transmitter control part for performing a control to transmit the encrypted contents data through the plural signal lines to the contents data receiver after the key information is transmitted by the transmitter transmission/reception part through the plural signal lines, and the contents data receiver includes:
a receiver transmission/reception part for receiving data transmitted from the contents data transmitter through the plural signal lines;
a key information extraction part for extracting the key information from the data received by the receiver transmission/reception part;
a contents decryption part for extracting the encrypted contents data from the data received by the receiver transmission/reception part and decrypting the encrypted contents data by using the key information extracted by the key information extraction part;
an output part for outputting the contents data decrypted by the contents decryption part; and
a receiver control part for performing a control to extract the key information from the data received by the receiver transmission/reception part and to decrypt the encrypted contents data received by the receiver transmission/reception part, the contents data transmitter includes a transmitter ID authentication part which includes a transmission ID storage part for storing plural pieces of receiver ID information allocated to respective contents data receivers, and selects one piece of receiver ID information of the plural pieces of receiver ID information and confirms that information indicating coincidence of the receiver ID information is transmitted from the contents data receiver, the transmitter control part performs a control to transmit the receiver ID information selected by the transmitter ID authentication part by the transmitter transmission/reception part through the plural signal lines to the contents data receiver, and performs a control, when the information indicating the coincidence of the receiver ID information is received from the contents data receiver, to transmit the key information and the encrypted contents data by the transmitter transmission/reception part through the plural signal lines to the contents data receiver, the contents data receiver includes a receiver ID authentication part which includes a reception ID storage part for storing receiver ID information allocated to the contents data receiver and checks the receiver ID information transmitted from the contents data transmitter against the receiver ID information stored in the reception ID storage part, and the receiver control part performs a control, in a case where the receiver ID information transmitted from the contents data transmitter is coincident with the receiver ID information stored in the reception ID storage part, to transmit the information indicating the coincidence of the receiver ID information to the contents data transmitter through a single signal line by the receiver transmission/reception part.

6. The contents data transmission/reception system according to claim 5, wherein the plural signal lines are parallel signal lines.

7. The contents data transmission/reception system according to claim 6, wherein the parallel signal lines comprise channels of an audio data transmission path and the contents data comprises multi-channel audio data.

8. A contents data transmitter for transmitting contents data to a contents data receiver, comprising:
a contents reproduction part for reproducing the contents data;
a key information creation part for creating key information for encrypting the contents data;
a contents encryption part for encrypting the contents data reproduced by the contents data reproduction part by using the key information created by the key information creation part;
a transmitter transmission/reception part for transmitting the key information and the encrypted contents data through parallel signal lines to the contents data receiver; and
a transmitter control part for performing a control to transmit the encrypted contents data by the transmitter transmission/reception part through the parallel signal lines to the contents data receiver after the key information is transmitted by the transmitter transmission/reception part through the parallel signal lines.

9. A contents data transmitter according to claim 8, wherein the parallel signal lines comprise channels of an audio data transmission path and the contents data comprises multi-channel audio data.

10. A contents data transmitter for transmitting contents data to a contents data receiver, comprising:
a contents reproduction part for reproducing the contents data;
a key information creation part for creating key information for encrypting the contents data;
a contents encryption part for encrypting the contents data reproduced by the contents data reproduction part by using the key information created by the key information creation part;
a transmitter transmission/reception part for transmitting the key information and the encrypted contents data through plural signal lines to the contents data receiver;
a transmitter control part for performing a control to transmit the encrypted contents data by the transmitter transmission/reception part through the plural signal lines to the contents data receiver after the key information is transmitted by the transmitter transmission/reception part through the plural signal lines; and
a transmitter ID authentication part which includes a transmission ID storage part for storing plural pieces of receiver ID information allocated to respective contents data receivers, and selects any one piece of receiver ID information of the plural pieces of receiver ID information and confirms that information indicating coincidence of the receiver ID information is transmitted from the contents data receiver,
wherein the transmitter control part performs a control to transmit the receiver ID information by the transmitter transmission/reception part through the plural signal lines to the contents data receiver and performs a control, after the information indicating the coincidence of the receiver ID information is received from the contents data receiver, to transmit the key information and the encrypted contents data by the transmitter transmission/reception part through the plural signal lines to the contents data receiver.

11. The contents data transmitter according to claim 10, wherein the plural signal lines are parallel signal lines.

12. The contents data transmitter according to claim 11, wherein the parallel signal lines comprise channels of an audio data transmission path and the contents data comprises multi-channel audio data.

13. A contents data receiver for receiving contents data transmitted by a contents data transmitter, comprising:
a receiver transmission/reception part for receiving data transmitted by the contents data transmitter through parallel signal lines;
key information extraction part for extracting key information from the data received by the receiver transmission/reception part;
a contents decryption part for extracting encrypted contents data from the data received by the receiver transmission/reception part and decrypting the encrypted contents data by using the key information extracted by the key information extraction part;
an output part for outputting the contents data decrypted by the contents decryption part; and
a receiver control part for performing a control to extract the key information from the data transmitted by the contents data transmitter through the parallel signal lines and to decrypt the encrypted contents data transmitted by the contents data transmitter through the parallel signal lines by using the key information.

14. A contents data receiver according to claim 13, wherein the parallel signal lines comprise channels of an audio data transmission path and the contents data comprises multi-channel audio data.

15. A contents data receiver for receiving contents data transmitted by a contents data transmitter, comprising:
a receiver transmission/reception part for receiving data transmitted by the contents data transmitter through plural signal lines;
key information extraction part for extracting key information from the data received by the receiver transmission/reception part;
a contents decryption part for extracting encrypted contents data from the data received by the receiver transmission/reception part and decrypting the encrypted contents data by using the key information extracted by the key information extraction part;
an output part for outputting the contents data decrypted by the contents decryption part; and
a receiver control part for performing a control to extract the key information from the data transmitted by the contents data transmitter through the plural signal lines and to decrypt the encrypted contents data transmitted by the contents data transmitter through the plural signal lines by using the key information; and
a receiver ID authentication part which includes a reception ID storage part for storing receiver ID information allocated to the contents data receiver, and checks the receiver ID information transmitted by the contents data transmitter against the receiver ID information stored in the reception ID storage part,
wherein the receiver control part performs a control, when the receiver ID information transmitted by the contents data transmitter through the plural signal lines is coincident with the receiver ID information stored in the reception ID storage part, to transmit the information indicating the coincidence of the receiver ID information to the contents data transmitter through a single signal line by the receiver transmission/reception part.

16. The contents data receiver according to claim 15, wherein the plural signal lines are parallel signal lines.

17. The contents data receiver according to claim 16, wherein the parallel signal lines comprise channels of an audio data transmission path and the contents data comprises multi-channel audio data.

18. A contents data transmission/reception method for transmitting and receiving contents data between a contents data transmitter and a contents data receiver, comprising:
a first step of transmitting receiver ID information allocated to the contents data receiver from the contents data transmitter through plural signal lines to the contents data receiver;
a second step of checking the receiver ID information transmitted from the contents data transmitter through the plural signal lines against receiver ID information included in the contents data receiver and transmitting, in a case where these pieces of receiver ID information are coincident with each other, information indicating coincidence of the receiver ID information from the contents data receiver through a single signal line to the contents data transmitter;
a third step of, in a case where the information indicating the coincidence of the receiver ID information is received from the contents data receiver, transmitting key information encrypting the contents data from the contents data transmitter through the plural signal lines to the contents data receiver;
a fourth step of, when the key information is extracted from data transmitted from the contents data transmitter, transmitting information indicating reception of the key information from the contents data receiver through the single signal line to the contents data transmitter; and
a fifth step of, when the information indicating the reception of the key information is received from the contents data receiver, transmitting encrypted contents data from the contents data transmitter through the plural signal lines to the contents data receiver.

19. The contents data transmission/reception method according to claim 18, wherein the plural signal lines are parallel signal lines.

20. The contents data transmission/reception method according to claim 19, wherein the parallel signal lines comprise channels of an audio data transmission path and the contents data comprises multi-channel audio data.

* * * * *